June 17, 1952 L. P. MILLARD 2,600,416
DRIVE MECHANISM
Filed Sept. 8, 1950

INVENTOR.
*Lee P. Millard*
BY *Paul O. Pippel*
Atty.

Patented June 17, 1952

2,600,416

UNITED STATES PATENT OFFICE 2,600,416

DRIVE MECHANISM

Lee P. Millard, Chicago, Ill., assignor to International Harvester Company, a corporation of New Jersey Application September 8, 1950, Serial No. 183,797

1 Claim. (Cl. 74—230.17)

This invention relates to a new and improved drive mechanism.

A principal object of this invention is to provide a drive mechanism for receiving variable speed drive and converting it to a constant speed drive.

An important object of this invention is the provision of governor means in a variable speed pulley drive wherein the governor is associated with the output of the drive mechanism and acts to directly shift the pulley spacings to maintain a constant output drive regardless of the variable speed drive input.

Another important object of this invention is to supply a drive mechanism for agricultural implements such as harvester threshers in which it is desirable to operate the threshing means at a constant and uniform speed for most efficient threshing in spite of variations in the power input delivered to the harvester thresher.

Still another object of this invention is the provision of a cooperative V-belt pulley drive mechanism wherein means is provided for shifting the relative spacings of the V-belt pulleys in response to the output drive, whereupon the output drive remains constant although the input drive may vary through a relatively wide range of speeds.

Other and further important objects of this invention will become apparent from the disclosures in the following specification and accompanying drawing wherein:

The single figure is a top plan view of the drive mechanism of this invention with parts thereof broken away and other parts in section.

As shown in the drawing:

The reference numeral 10 indicates generally a supporting housing of a harvester thresher or the like for carrying a variable speed pulley drive mechanism comparable to that shown in the copending application on Variable Speed Pulley and V-belt Transmission, Serial No. 135,557, filed December 29, 1949. The present application has a common assignee with that of the copending aplication just mentioned.

As a general rule, harvester threshers, or combines as they are commonly known, are pulled by draft means such as tractors, and in smaller machines the power for driving the threshing mechanisms is taken from power take-off means on the pulling tractor. One of the principal reasons for the device of this invention is to eliminate changes in cylinder drive upon change in forward speed of the pulling tractor. This device compensates for such changes in tractor speeds and insures a substantially constant speed for the threshing cylinder for most effective grain threshing. As stated in the objects above, it is the primary function of this drive mechanism to eliminate fluctuations in the finally delivered drive to the threshing mechanisms and particularly the threshing cylinder whether that drive is obtained through power take-off shafts or from separate engine means.

The tractor power take-off drive is delivered to a universal joint 11 having one knuckle 12 forming a part of the drive shaft, not shown, and a complementary knuckle 13 directly fastened to and driving a V-belt pulley 14. The pulley 14 is journally mounted on a shaft 15 which in turn is carried in the supporting structure 10. A pedestal support member 16 is mounted on the side of the supporting member 10 by means of bolts or the like 17. The shaft 15 is journalled within this pedestal member 16 having a ball bearing 18 positioned intermediate the shaft and the member 16. A grease retainer 19 is positioned over the ball bearing 18 and is held in position by means of a cap 20 for the member 16. The cap 20 is held in fixed position on the pedestal 16 by means of bolts 21.

The pulley 14 comprises two halves 22 and 23. The pulley half 22 remains fixed in its longitudinal position with respect to the shaft 15 and the pulley half 23 is axially slidable over and along the shaft 15 to provide for various spacings between the pulley halves 22 and 23. The pulley half 22 is fastened to the shaft 15 by means of a key 24 and thus as the shaft 15 is rotatably driven the pulley half 22 is similarly rotatably driven. A sleeve 25 is positioned over the shaft 15 and is provided with spline teeth 26 around the circumference thereof. The pulley half 22 is provided with a collar 27 riveted or bolted thereto as shown at 28 which in turn is welded or otherwise fastened to the sleeve 25 as shown at 29. It will thus be evident that as the shaft 15 and the pulley half 22 rotate the sleeve 25 and its integral splines 26 will also be rotated.

The pulley half 23 is provided with a sleeve-like hub 30 having an outwardly extending annular flange 31 which is riveted to the pulley half 23 at 32. A longitudinally extending annular flange 33 of the pulley half 23 is concentric with the internally positioned sleeve member 30. A ball bearing 34 has its outer race 35 press fitted within the flange 33, and the inner race 36 provides a surface for engagement by a shifting fork 37. The internal surface of the sleeve 30 is splined as shown at 38 for cooperation with the external splines 26 of the sleeve 25. The pulley half 23 is thus permitted axial movement along the shaft 15 by reason of the splines 26 and 38, and by reason of these same splines, rotatable drive between the sleeve 26 and the pulley half 23 is accomplished.

The shifting fork 37 is pivoted at 39 on an arm 40 extending outwardly from the pedestal 16. A lateral and angular extension 41 of the shifting fork 37 is adapted to receive for attachment one end of an interconnecting link member 42 as shown at 43. The other end of the link 42 is pivotally fastened at 44 to a bell-crank lever 45 which includes a shifting fork 46 capable of shifting one half 47 of the cooperative drive mechanism pulley 48.

The pulley 48 is mounted on a shaft 49 disposed parallel to the shaft 15 and spaced therefrom. The shaft 15 in this drive mechanism must be considered the driving shaft and the shaft 49 is to be considered the driven shaft. The other pulley half 50 is relatively fixed longitudinally of the shaft 49 in the same manner as the pulley half 22 of the pulley 14. The driven shaft 49 passes into the supporting housing 10 and is adapted to impart rotational drive to the various threshing mechanisms by means of bevel gears 51 and 52.

The pulley half 50 is fastened to the shaft 49 by means of a key 53. The pulley half 50 is also provided with an internal collar 54 comparable to the collar 27 of the pulley 14. This collar 54 is riveted as shown at 55 to the pulley half 50. A sleeve member 56 is slidably mounted over the shaft 49 and is welded as shown at 57 to the collar 54. The outer surface of the sleeve 56 is equipped with spline teeth 58 comparable in every respect to the spline teeth 26 of the sleeve 25. A V-belt 59 joins the V-belt pulleys 14 and 48 and imparts drive from the shaft 15 to the shaft 49. Both halves 47 and 50 of the pulley 48 are thus rotatably driven. The pulley half 47 is equipped with an internal annular sleeve 60 having internal annular spline teeth 61 for cooperative engagement with the external spline teeth 58. The sleeve 60 has an outwardly extending annular flange 62 fastened by means of rivets or the like 63 to the pulley half 47. A longitudinally extending annular flange 64 is disposed around and spaced from the sleeve 60. A ball bearing 65 has its outer race member 66 press fitted within the flange 64, and the inner race 67 of the ball bearing 65 constitutes the surface against which the fork 46 actuates. A structural bracket member 68 is fastened to the main support 10 by means of bolts or the like 69. This bracket support 68 provides a pivotal mounting at 70 for the bell-crank lever 45 which includes the shifting fork 46. The pivotal mounting 70 is on an arm 71 depending from the bracket 68 by means of a bolt member 72.

From the foregoing description of the construction of the drive mechanism of this invention it will be apparent that as the interconnecting link 42 is moved the pulley halves 23 and 47 will be simultaneously moved an equal distance insuring that the V-belt 59 remain taut in the respective pulleys 14 and 48. Such shifting of the interconnecting link 42 automatically causes a change in the speed transmission from the shaft 15 to the shaft 49. In the present application of the device, as stated in the objects above, it is desirable to take an intermittent input drive and deliver a constant uniform speed output drive. This is accomplished by having a means operable in response to the output drive adapted to directly shift the interconnecting link 42 to accomplish a change in driving transmission from the pulley 14 to the pulley 48 to automatically compensate for variations in input driving speed.

A bevel gear 72 is fastened to the output or driven shaft 49 just prior to the entrance of the shaft into the housing support 10 of the thresher. A cooperative bevel gear 74 is disposed at right angles to the gear 73 and is rotatably driven thereby. The bevel gear 74 is mounted on a shaft 75 which is journally carried in a pillow-block type of bearing 76 mounted on the support 10 by means of bolts or the like 77. A box-like housing 78 is mounted on and fastened to the supporting structure 10. A sleeve bearing 79 is mounted in one wall 80 of the housing 78 and is in alignment with the pillow block bearing 76 for journally receiving the shaft 75. A sleeve 81 is disposed intermediate the bearings 76 and 79 to facilitate the fixed spacing between these elements. The housing 78 encloses a ball-type governor 82. A rod 83 is spaced from the end of the shaft 75 and is disposed in axial alignment therewith. The rod 83 is slidably mounted in a sleeve bearing 84 which is carried by a wall 85 of the governor housing 78 and disposed opposite the wall 80 carrying the sleeve bearing 79.

An ear or lug member 86 forms a part of the shifting fork or bell-crank lever 37 and is adapted to pivotally receive the outer end of the rod 83 at 87. Spaced annular flanges 88 and 89 are provided on the inner end of the shaft 83 adjacent the governor 82 and define an annular groove 90. The governor 82 is provided with a pair of toggle links 91 and 92 pivotally attached at 93 to the shaft 75. A complementary pair of toggle links 94 and 95 are pivotally joined at 97ª and 97ᵇ to a ring member 96 encircling the shaft 83 in the annular groove 90. The outer ends of the pairs of toggle links are joined at 98 and 99 and have weight members 100 and 101 fastened to these pivotal attachments 98 and 99 respectively. A spring member 102 is fastened to the pivotal attachments 98 and 99 and normally urges an inward movement of the weight members 100 and 101. An increase in speed of rotation of the shaft 75 causes the weight members 100 and 101 to be thrown centrifugally outwardly against the action of the spring 102 and simultaneously pulling the shaft 83 inwardly toward the center of the housing 78 and thereupon causing the shifting fork 37 to be moved longitudinally of the shaft 15 away from its engagement with the inner race 36 of the ball bearing member 34, thus permitting the pulley half 23 to move away from the fixed pulley half 22 and causing the belt 59 to ride at a lower position within the pulley 14. Simultaneously, the interconnecting link 42 causes the shifting fork 46 to move the pulley half 47 closer to the pulley half 50 with the result that the V-belt 59 rides higher in the pulley 48. The overall result of the increased output speed of the shaft 49 causes a change in driving ratio between the V-belt pulleys 14 and 48 and immediately slows the speed of the shaft 49. The action of the governor 82 is so quick to act that the shaft 49 continues to rotate at a substantially constant and uniform speed. Conversely, when the shaft 49 tends to slow down, the centrifugal action of the weights 100 and 101 is insufficient to maintain the spring 102 extended and the weights are in fact pulled in by the action of the spring 102 causing an extension of the shaft 83 and a simultaneous movement of the shifting fork 37 to close the space between the pulley halves 23 and 22 and similarly and simultaneously to open the spacing between the pulley halves 47 and 50.

The assembly on the shaft 15 is maintained in fixed position thereon by means of a nut 103 engaging a reduced diameter and threaded extension 104 of the shaft 15. A washer member 105 is positioned intermediate the hub 106 of the pulley half 22 and the nut 103 and is of sufficient diameter to maintain the pulley half 22 against endwise movement on the shaft 15. A similar construction is shown on the driven shaft 49 wherein a nut 107 engages a reduced and threaded extension 108 of the shaft 49 and abuts a washer 109 maintaining the sleeve member 58 against endwise shifting.

In operation, the pulling tractor delivers rotative power to the knuckle 12 of a universal joint 11. Very often there is considerable angularity between the knuckles 12 and 13 and thus there normally exists a surging drive between the knuckles. Drive is thereupon delivered to the shaft 15 and to the pulley 14 whereupon the V-belt 59 delivers that incoming drive to the pulley 48. The shaft 49 on which the pulley 48 is mounted imparts this rotative drive to the threshing elements of the combine. As the driven shaft 49 varies in speed occasioned by variations in the input speed to the shaft 15, the governor 82 acts to compensate for this variable input speed and directly acts to shift the pulley halves 23 and 47 of the respective pulleys 14 and 48 to thereupon change the driving ratio between the pulleys 14 and 48 and thus maintain a constant output drive to the shaft 49. The driving mechanism of this invention thus minimizes the variations in input speed of drive and automatically produces a constant speed output shaft which is very conducive to efficient threshing of grain.

Numerous details of construction may be varied throughout a wide range without departing from the principles disclosed herein, and I therefore do not propose limiting the patent granted hereon otherwise than as necessitated by the appended claim.

What is claimed is:

A variable speed pulley and V-belt transmission comprising a supporting structure, a driving shaft journaled on said supporting structure, a driven shaft parallel to and journaled on said supporting structure, a first adjustable V-pulley mounted on said driving shaft, a second adjustable V-pulley mounted on said driven shaft and in alignment with said first adjustable V-pulley, said first adjustable V-pulley having a half thereof fixed to said drive shaft and the other half thereof slidable on said drive shaft toward and away from said fixed half, said second adjustable V-pulley having a half thereof fixed to said driven shaft in alignment with the slidable half of the first adjustable V-pulley and the other half thereof slidable on said driven shaft in alignment with the fixed half of the first adjustable V-pulley, a first fork means pivotally mounted on said supporting structure adjacent the slidable half of the first adjustable V-pulley, a second fork means pivotally mounted on said supporting structure adjacent the slidable half of the second adjustable V-pulley, a V-belt joining said first and second adjustable V-pulleys, tie rod means joining the first and second fork means, centrifugal means, means rotatably driving said centrifugal means from said driven shaft, said centrifugal means including a plurality of weights, springs normally holding said weights radially inwardly, a longitudinally slidable link, means transmitting slidable movement to said slidable link in response to the radial extension of said weights, and pivotal means joining said slidable link to said tie rod means, whereby the speed of the driven shaft acts to directly extend or withdraw said link an amount proportional to the speed of the driven shaft and thus automatically compensate for variations in driving speed in maintaining a substantially constant driven speed.

LEE P. MILLARD.

REFERENCES CITED

The following references are of record in the file of this patent:

UNITED STATES PATENTS

| Number | Name | Date |
| --- | --- | --- |
| 350,053 | Guttinger | Sept. 28, 1886 |
| 2,158,367 | Henney | May 16, 1939 |
| 2,336,002 | Everett | Dec. 7, 1943 |
| 2,533,197 | Pinkvoss | Dec. 5, 1950 |

FOREIGN PATENTS

| Number | Country | Date |
| --- | --- | --- |
| 333,120 | Italy | Dec. 19, 1935 |
| 548,600 | France | Jan. 18, 1923 |